US006975835B1

(12) United States Patent
Lake et al.

(10) Patent No.: US 6,975,835 B1
(45) Date of Patent: Dec. 13, 2005

(54) METHOD AND APPARATUS FOR AN INTERACTIVE WEB RADIO SYSTEM THAT BROADCASTS A DIGITAL MARKUP LANGUAGE

(75) Inventors: Ron Lake, West Vancouver (CA); Brent Bolleman, Vancouver (CA)

(73) Assignee: Sonigistix Corporation, Richmond (CA)

( * ) Notice: Subject to any disclaimer, the term of this patent is extended or adjusted under 35 U.S.C. 154(b) by 0 days.

(21) Appl. No.: 09/390,946

(22) Filed: Sep. 7, 1999

Related U.S. Application Data

(60) Provisional application No. 60/099,512, filed on Sep. 8, 1998.

(51) Int. Cl.[7] ................................................ H04Q 7/00
(52) U.S. Cl. ...................................... 455/3.01; 455/557
(58) Field of Search ............................ 707/501.1, 513; 709/217, 219, 216, 239; 725/126; 455/557, 455/46, 3.01; 340/311.2; 703/217, 219; 729/126

(56) References Cited

U.S. PATENT DOCUMENTS

| | | | | |
|---|---|---|---|---|
| 5,564,073 | A * | 10/1996 | Takahisa | 455/3.06 |
| 5,572,201 | A * | 11/1996 | Graham et al. | 340/902 |
| 5,818,441 | A | 10/1998 | Throckmorton et al. | |
| 5,905,865 | A * | 5/1999 | Palmer et al. | 725/112 |
| 6,021,433 | A * | 2/2000 | Payne et al. | 709/219 |
| 6,081,907 | A * | 6/2000 | Witty et al. | 714/6 |
| 6,088,455 | A * | 7/2000 | Logan et al. | 380/200 |
| 6,442,598 | B1 * | 8/2002 | Wright et al. | 709/217 |
| 6,604,242 | B1 * | 8/2003 | Weinstein et al. | 725/109 |

* cited by examiner

*Primary Examiner*—Nick Corsaro
(74) *Attorney, Agent, or Firm*—Blakely, Sokoloff, Taylor & Zafman

(57) ABSTRACT

An interactive radio system is disclosed. The overall architecture of the interactive radio system includes a broadcast system for broadcasting digital information across a radio signal to web radio receiver units. An interactive broadcast reception system includes a general purpose computer having a processor, display, and storage and internet connection, a broadcast receiver to communicate with the general purpose computer and to decode digital subcarrier data formatted as a broadcast markup language document, and application software that runs on the processor of the computer and communicates with the broadcast receiver to control the operation of the broadcast receiver and to respond to broadcast markup language commands in said broadcast markup language document by connecting to an internet address referenced in said digital subcarrier data.

5 Claims, 14 Drawing Sheets

METHOD AND APPARATUS FOR AN INTERACTIVE WEB RADIO SYSTEM THAT BROADCASTS A DIGITAL MARKUP LANGUAGE

The present non-provisional patent application claims priority to the provisional patent application filed by the present Applicants on Sep. 8, 1998 and assigned Ser. No. 60/099,512.

FIELD OF THE INVENTION

The present invention relates to the field of digital information distribution using radio broadcasts. In particular the present invention discloses a web radio system wherein digital information including coded markup language information is broadcast to computer systems using radio frequency subcarriers and computer systems coupled to web radio receivers may interact with such information using the global Internet.

BACKGROUND OF THE INVENTION

Use of the FM Subcarrier for transmission of digital data has been developed and used for more than a decade in Europe. The FM Subcarrier data transmission system developed in Europe is known as the Radio Data System (RDS) standard. The Radio Data System (RDS) standard has been adopted and extended for use in North America through the National Association of Broadcasters. The North American version is known as the Radio Broadcast Data System (RBDS). The Radio Broadcast Data System (RBDS) system of FM Subcarrier data transmission has been used for several years in North America.

The RDS/RBDS standards allow for a variety of simple data transmission applications such as broadcast of station identification, time synchronization, and information about the current artist or song that is being played. RDS has also been used for the transmission of differential GPS data and for the transmission of paging information. Radios that support the RDS/RBDS standards allow listeners to:

- See the call letters of the tuned radio station.
- Tune a radio station by selecting a radio program format (e.g. top 40, sports, oldies, jazz, country, talk radio etc.).
- View song titles and artist names.
- Hear traffic bulletins automatically.
- Respond to emergency alerts. For example, radios turn on and interrupt in-car CD players and cassette players for traffic or emergency alerts.
- Check paging messages.
- View short information messages such as stock quotes, sports scores, restaurant/hotel directions, etc.
- Synchronize clocks automatically.
- Receive the phone number or contact information for RBDS advertisers.

In December 1994, the United States Federal Communication Commission (FCC) announced its support for using RBDS technology to transmit Emergency Alert System (EAS) alerts in times of local or national emergencies over FM broadcast stations. The FCC recommendation is not only clear evidence that RBDS technology is viable today, but clear direction that broadcasters should consider RBDS an integral part of our nation's radio broadcasting infrastructure for the foreseeable future. As of August 1998, there were 300 radio stations broadcasting digital data using the RBDS standard.

The RBDS/RDS signals are low bit rate data streams transmitted on the 57 kHz subcarrier of an FM radio signal. The RBDS/RDS data rate is 1,187.5 bits per second. However, ten out of every twenty-six bits transmitted are used for error correction coding that is used to combat signal distortions that occur in the transmission path. Consequently, there is only about 730 bits per second of usable data bandwidth in an RDS signal. The data in the RDS signal is transmitted in 104-bit groups, each of which consists of four 26-bit blocks. Since ten of the twenty-six bits in each block are used for error correction coding, there are sixteen bits of information in each block. The type of information included in each block is dependent on the group type. There are 32 different group types (0A, 0B, 1A, 1B, . . . , 15A, and 15B). Certain types of information, such as the Program Identification (PI) code used to identify the transmitting station, are transmitted in every group type.

In essence, the RBDS/RDS and similar standards allow for the low bandwidth one way transmission of information from a broadcaster to suitably equipped radio receivers. The RBDS/RDS standards do not deal with interactivity in any way nor do they provide any capability for the receiver or audience of receivers to provide feedback to the broadcaster. There is also no way for the RBDS/RDS or other such systems to acquire additional information from other media which is or which can be coordinated with the audio broadcast. Although the RBDS/RDS systems provide useful features, it would be desirable for these services to provide a more interactive system. Furthermore, it would be desirable to increase the bandwidth such that additional information can be sent to the listener.

SUMMARY OF THE INVENTION

The present invention discloses an interactive radio system. The overall architecture of the present invention includes a broadcast system for broadcasting digital information across a radio signal to web radio receiver units. In a preferred embodiment, the digital data is encoded using the RBDS/RDS standards. The broadcast system of the present invention includes tools for generating audio streams with associated digital content. In a preferred embodiment, the digital information consists of Radio Broadcast Markup Language (RBML) documents that are processed and displayed by the computer system. The broadcast audio and digital content is received by web radio receiver units. The web radios play the audio portion and simultaneously pass the digital information to a computer system that is coupled to the web radio. The digital content may specify links to additional information available on the World Wide Web. Thus, the combination of a broadcast data system and the internet provides a method of allow radio listeners to interact with a radio broadcasters. Specifically, the system of the present invention can be used to allow audience participation, provide audience tracking, provide listener credits, and enhance radio broadcasts through a combination of data pushed over the broadcast network and data pulled from the Internet.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

Figure 1:
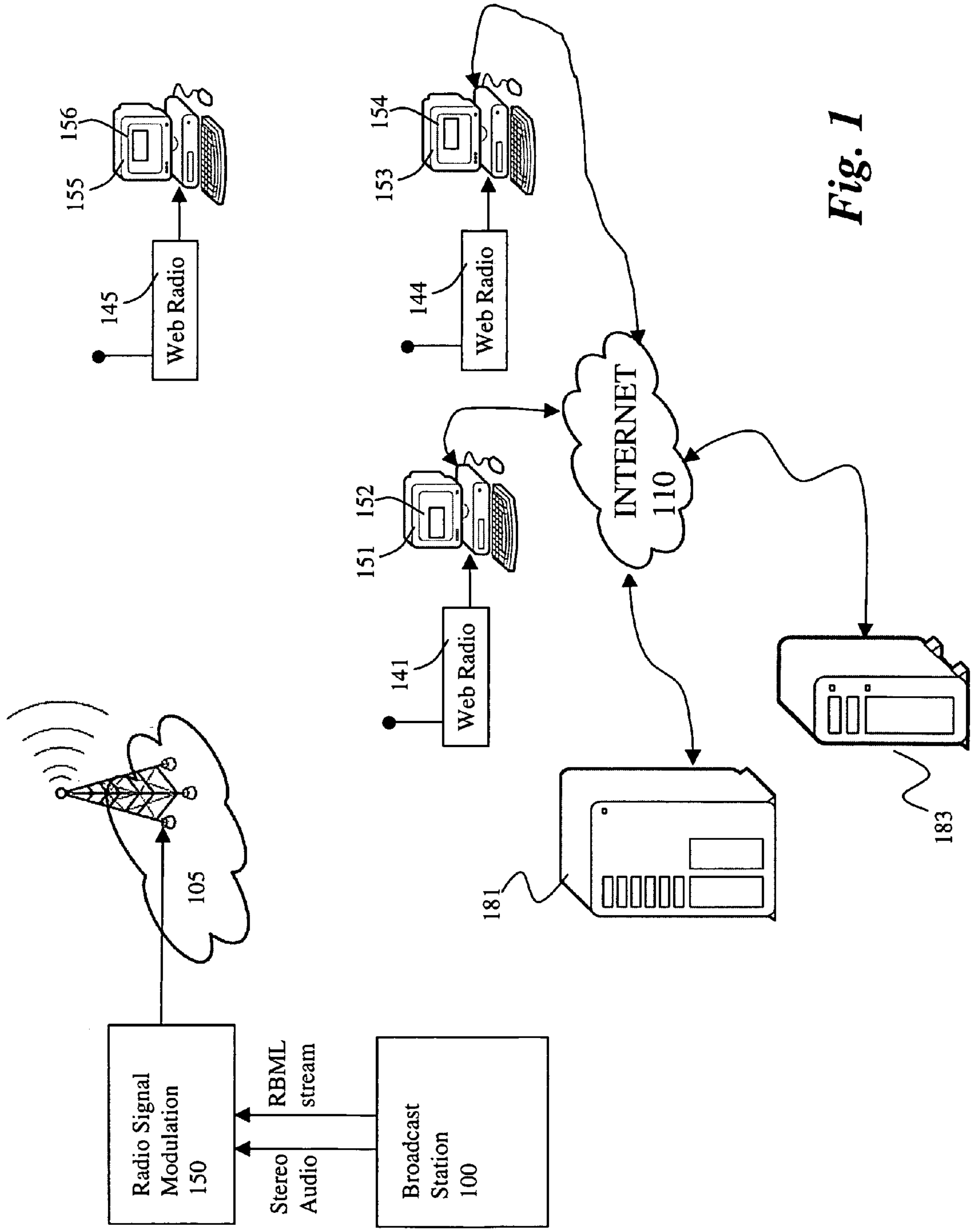
FIG. 1 illustrates an overall block diagram of a web radio broadcasting system including a web radio broadcaster and several web radio receivers.

A method and apparatus for distributing digital markup language documents using radio frequency subcarriers is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the extensible markup language (XML). However, the same techniques can easily be applied to other types of markup languages.

A Web Radio System

The Radio Broadcast Data Service (RBDS) and the Radio Data Service (RDS) provide a method of widely broadcasting digital information to suitably equipped radio receivers. However, RBDS/RDS and similar Radio Frequency (RF) broadcast standards do not provide any interactivity. Furthermore, the very low bandwidth of the RBDS/RDS and similar standards severely limits the amount of information that may be sent to receivers. To improve upon the present invention introduces a "Web Radio" that combines the one-way broadcast nature of the RBDS/RDS systems with the interactivity and larger bandwidth of the World Wide Web on the Internet. Specifically, the system of the present invention can be used to allow audience participation, provide audience tracking, provide listener credits, and enhance radio broadcasts through a combination of data pushed over the broadcast network and data pulled from the Internet.

The World Wide Web on the Internet

The Internet is a global interconnection of computer networks that share a standard set of protocols. Specifically, every computer connected directly to the Internet communicates using the well-known Internet Protocol (IP).

The World Wide Web is the term for a particular data sharing application on the Internet. Specifically, the World Wide Web consists of a plurality of Web servers that respond to information requests from Web clients (also known as Web browsers) such as Netscape's Navigator and Microsoft's Internet Explorer. The web browsers make requests using the Hypertext Transfer Protocol (HTTP) which is a layered on top of the Internet Protocol (IP). The main document stored on web servers are Hypertext Markup Language (HTML) documents. The web browsers receive HTML documents from the web servers in response to requests. The web browsers interpret the HTML documents to render a display on the client computer system. The World Wide Web on the Internet has undergone a phenomenal explosion in growth during the past five years. It is estimated that there are now more than 30,000,000 active web sites world wide.

Extensible Markup Language

Recently, the World Wide Web has seen the introduction of the extensible markup language (XML). Extensible markup language (XML) provides for the description of the structure of a hypermedia document content in a manner that is independent of the way in which the hypermedia document data is displayed. XML is widely supported by computer software vendors (Microsoft, IBM, Sun and Netscape) and is growing rapidly on the World Wide Web as the preferred mechanism for the description and transfer of structured content. Detailed information about the Extensible markup language (XML) can be found at the Internet web site http://www.xml.com/

An XML Based Web Radio System

To provide interactivity to the RBDS/RDS systems, the present invention proposes a "Web Radio" system comprising a web radio receiver and an associated computer system. A Web Radio receiver is a radio frequency broadcast receiver that demodulates radio frequency signals to play audio and demodulates an encoded data signal to receive encoded digital information. The radio frequency broadcast is a one to many communication means that carries a mixture of analog and digital data. In a preferred embodiment, the receiver uses the FM broadcast band radio frequency. Furthermore, in a preferred embodiment, the broadcaster uses the RBDS/RDS standard for modulating digital data onto an FM subcarrier. The encoded digital information that is received by the web radio receiver system is passed to the associated computer system coupled to the Web Radio. The associated computer system processes and displays the encoded information. In a preferred embodiment, the associated computer system comprises a standard personal computer system with a World Wide Web browser program for browsing the World Wide Web on the Internet. The web radio receiver may be an internal or external peripheral of the associated computer system. An external web radio receiver may be used without a computer system.

FIG. 1 illustrates an overall diagram of a Web Radio system. Referring to FIG. 1, a broadcaster 100 generates an audio signal and a corresponding digital data signal that is passed to a radio signal modulator 150. The radio signal modulator 150 modulates the signal and then a transmitter 105 broadcasts the radio signal using a format that includes encoded digital data. For example, an FM radio station can be used to broadcast FM radio signals that carry stereo audio and encoded digital data. The digital data may be modulated on a subcarrier using the RBDS/RDS standard. In a preferred embodiment, the encoded digital data carries digital information encoded in a format that is a subset of the extensible markup language (XML) documents.

A plurality of web radios 141, 143, and 145 receive the broadcast radio signals and play the audio on a speaker. The web radios 141, 143, and 145 also decode the digital data modulated onto the FM subcarrier such as RBDS/RDS. The web radios 141, 143, and 145 may display information from the RBDS/RDS system onto a small display such as an LCD display. The web radios 141, 143, and 145 may be coupled to computer systems such as computer systems 151, 153, and 155 such that the encoded digital data can be passed to the associated computer system. In a preferred embodiment, the web radios are coupled to the associated computer system using the Universal Serial Bus (USB) communication standard. However, other digital communication standards such as the IEEE 1394 Firewire standard may be used. Furthermore, the web radio may be an internal card such as a PCI card to in inserted into a PCI bus slot.

Once the received digital data has been passed to the computer system, the computer system can further process and display the digital data. Specifically, the computer systems run web radio application programs 152, 154, and 156 that process the digital data. In one embodiment, the web radio application programs on the computer system receives all the digital data from the web radio and controls the processing of the web radio received digital data. The web radio application program may use other programs on the computer system to help process and display the received digital information.

Preferably, the computer systems, such as computer systems 151 and 153, are coupled to the global Internet 110 and include web browser programs. When the computer systems 151 and 153 are coupled to the Internet, the computers can then access Internet information that is referred to by the digital information received from the associated web radio unit such as web sites on Internet servers 181 and 183. This "back channel" allows users to interact based on information received from the web radio unit. For example, the computer system may access a web site of the radio station that is being listened to. The back channel does not need to be continuously connected such that dial-up Point-to-Point protocol (PPP) Internet connections can be used.

In one embodiment, a user interface is presented on the computer system that allows a listener to control the web radio from the computer system. The user interface allows the listener to select a radio frequency and set a volume.

Radio Broadcast Markup Language

In a preferred embodiment, the web radio broadcasters broadcast digital information that include extensible markup language (XML) encoded documents. Specifically, the digital information is encoded into Radio Broadcast Markup Language (RBML) documents wherein Radio Broadcast Markup Language (RBML) is a well defined subset of the extensible markup language (XML).

Radio Broadcast Markup Language (RBML) is designed to carry useful information in relatively small documents. To leverage upon the huge existing Internet infrastructure, RMBL is also designed to work with the existing World Wide Web on the global Internet. Thus, many of the RBML document tags refer to information that can be accessed on the World Wide Web.

The Radio Broadcast Markup Language (RBML) is processed by a web radio application program known as a "RBML processor" running on the associated computer system. The RBML processor component can be implemented so as to receive and respond to existing RBDS and RDS data streams in the same manner as more rigid RBDS or RDS decoders. However, when RBDS/RDS streams are encoded as RBML documents, the RBML documents provide a much richer collection of content and receiver driven behavior including radio coupons, banner display text, linking to URL's on the Internet, and provision of listening credits supporting a wide variety of receiver side activities.

RBML is based on a RBML Document Type Definition (DTD). The RBML Document Type Definition (DTD) defines a set of active RBML tags. A copy of the RBML Document Type Definition (DTD) is stored within the RBML processor. The RBML Document Type Definition (DTD) is used to assist with the parsing and validating of all received RBML.

An RBML extension command is provided to allow the RBML Document Type Definition (DTD) to be downloaded to the receiver from the broadcaster. Thus, the web radio system can be used to update the RBML standard. These updates are performed in a manner that is transparent to the listener. Updates can be used to widely distribute the RBML standard and create local RBML extensions that can be made without impacting the overall applicability of the RBML standard. The RBML DTD is loaded into the computer based RBML processor each time that the RBML processor is started on the computer.

As previously set forth, the RBML processor is based on XML processor technology. The RBML processor validates the received RBML data stream and then invokes RBML response handlers. Each RMBL response handler is an individual software function. Each function may include its own state data that is logged into permanent storage. Several specific response handlers are described in this disclosure. However, a key feature of the present invention is that additional RBML handlers can be developed in the future and distributed using the update mechanism.

The following table lists several example RBML tags that may be used to create RBML documents. Each RBML tag has an associated handler for processing the RBML tag.

| | |
|---|---|
| GETURL | Causes a web browser on the Computer to access a specified URL. |
| POPUP | Causes a Pop-Up dialog box to appear on the computer system display. |
| COUPON | Sends an electronic coupon to the computer system. |
| FBANNER | Causes a floating banner to appear on the computer system display. |
| SBANNER | Causes a scrolling banner to appear on the computer system display. |
| SYNCHCLOCK | Synchronizes a local clock to a clock value. |
| STARTSEG | Starts a timed radio segment. |
| TAGSEG | Tags a name to a timed segment. |
| ENDSEG | Ends a timed segment |
| CREDIT | Cause a listener credit to be given to the RBML processor |
| EMERGENCY | Causes an emergency message and tone to be presented. |
| STREAMTEXT | Displays scrolling text which may be continuously updated by broadcast or web information. Examples include weather and stock rices. |

-continued

| | |
|---|---|
| UPDATE | Prepares RBML processor for updates such as a new RBML DTD |
| PAGE | Notify the user of a user specific event (eg, email arrival) |
| STOCKQUOTE | Causes a stock quote to be displayed on the computer system display. |

The RBML tags are formatted into simple RBML documents that are sent using the RBDS/RDS system. For example, the following short RBML document specifies that a pop-up dialog box appear on the computer screen wherein detailed information to create the pop-up dialog box is obtained from a cited web site using a URL:

<popup URL= "http://www.lycos.com/emarket/shopping/popmax.html"><control="Y"></popup>

The following RBML document specifies that a stock quote be displayed on the computer system:

<stockquote URL="httapwww.personalwealth.com", symbol= "MSN"></stockquote>

The stockquote RBML tag requires a symbol parameter that specifies a stock symbol to provide a quote for. An optional URL is provided that specifies a quote service to use. If no URL is provided, a default stock quote URL will be used.

Web Radio Broadcasting Tools

To simplify the broadcaster's task of creating RBML encoded documents to broadcast with a RBDS/RDS broadcasting system, the present invention provides tools for the radio broadcaster. The broadcaster tools provide an RBML authoring system that allow RBML documents to be quickly created to insert into a radio broadcast. Two examples of RBML authoring tools are provided: a real-time RBML authoring tool and an offline RBML sequencer/authoring tool. However, many other types of RBML authoring tools could be created.

Real-Time RBML Authoring Tool

To support the real-time creation of RBML documents to be embedded in live radio broadcasts, the present invention introduces a real-time RBML Authoring Tool. The real-time RBML Authoring Tool enables the real time insertion of RBML tags into an RBDS/RDS subcarrier stream.

Figure 2A:
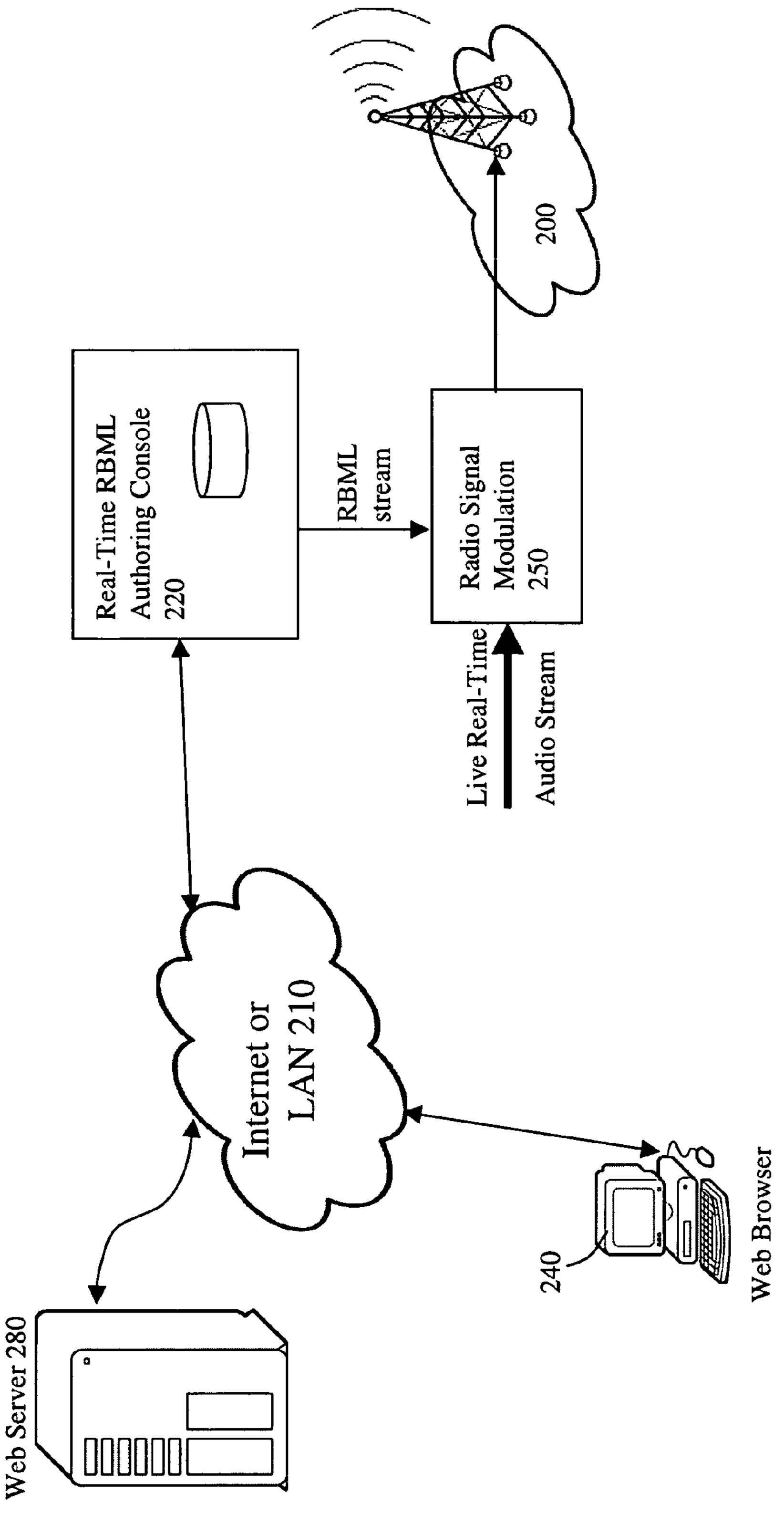
FIG. 2A illustrates a diagram that shows how a console based real-time RBML Authoring Tool may be used within a radio broadcast station.

FIG. 2A illustrates a first possible embodiment of a real-time RBML Authoring Tool for use within a radio broadcast station. Referring to FIG. 2A, an operator may use a dedicated real-time RBML Authoring Tool console 220. The operator specifies RBML documents that should be inserted into the broadcast streaming using a graphical interface on the dedicated real-time RBML Authoring Tool console 220. The operator may make access web sites on the Internet 210 and include information from the servers on the Internet such as server 280 when generating RBML documents. The dedicated real-time RBML Authoring Tool console passes the specified RBML documents to an RBDS/RDS modulator 250 that modulates the specified RMBL documents onto an FM subcarrier and modulates live broadcast audio onto an FM carrier. The FM signal is then broadcast using an FM transmitter and antenna 200.

Figure 2B:
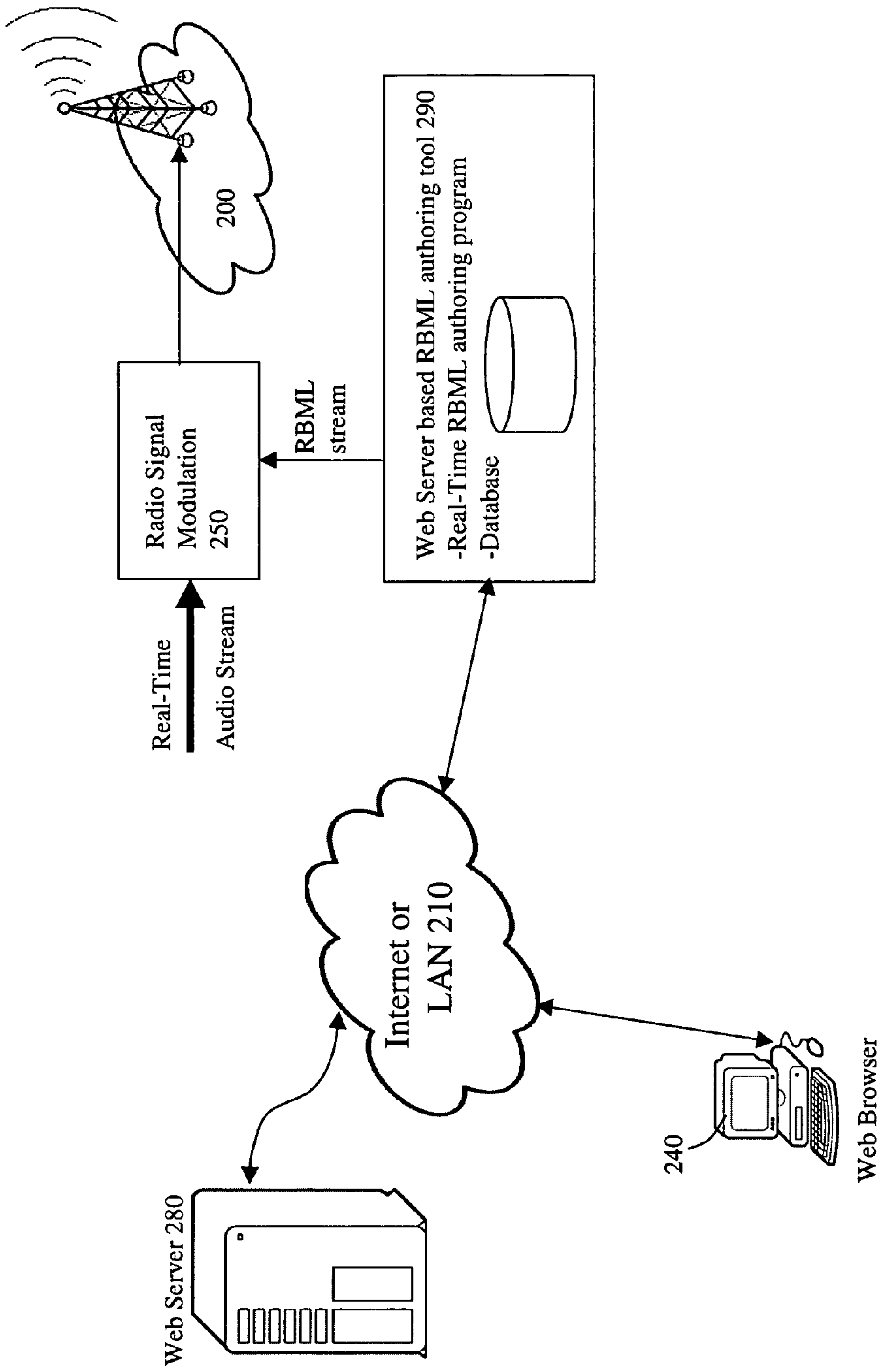
FIG. 2B illustrates a diagram that shows how a web server based real-time RBML Authoring Tool may be used within a radio broadcast station.

FIG. 2B illustrates a second embodiment of a real-time RBML Authoring Tool. The real-time RBML Authoring Tool of FIG. 2B into is a web server based real-time RBML Authoring Tool 290. The web server based real-time RBML Authoring Tool 290 consists of a program that may be accessed and controlled by any web browser that has access to the server computer running the web server based real-time RBML Authoring Tool 290. Thus, an operator may access the web server based real-time RBML Authoring Tool 290 from a remote site using a web browser 240 coupled to the Internet 210. To prevent unauthorized use, the web server based real-time RBML Authoring Tool 290 is protected with access passwords and communication between the browser 240 and the web server based real-time RBML Authoring Tool 290 is encrypted.

The web server based real-time RBML Authoring Tool 290 may be implemented using Microsoft Active Server Page (ASP) technology, Common Gateway Interface (CGI) technology, or Sun Microsystem's Java technology. The web server based real-time RBML Authoring Tool 290 responds to commands received from an authorized browser and generates appropriate RMBL documents that are sent to an RBDS/RDS modulator 250 that modulates the specified RMBL documents onto an FM subcarrier and modulates live broadcast audio onto an FM carrier. The FM signal is then broadcast using an FM transmitter and antenna 200.

Figure 3:
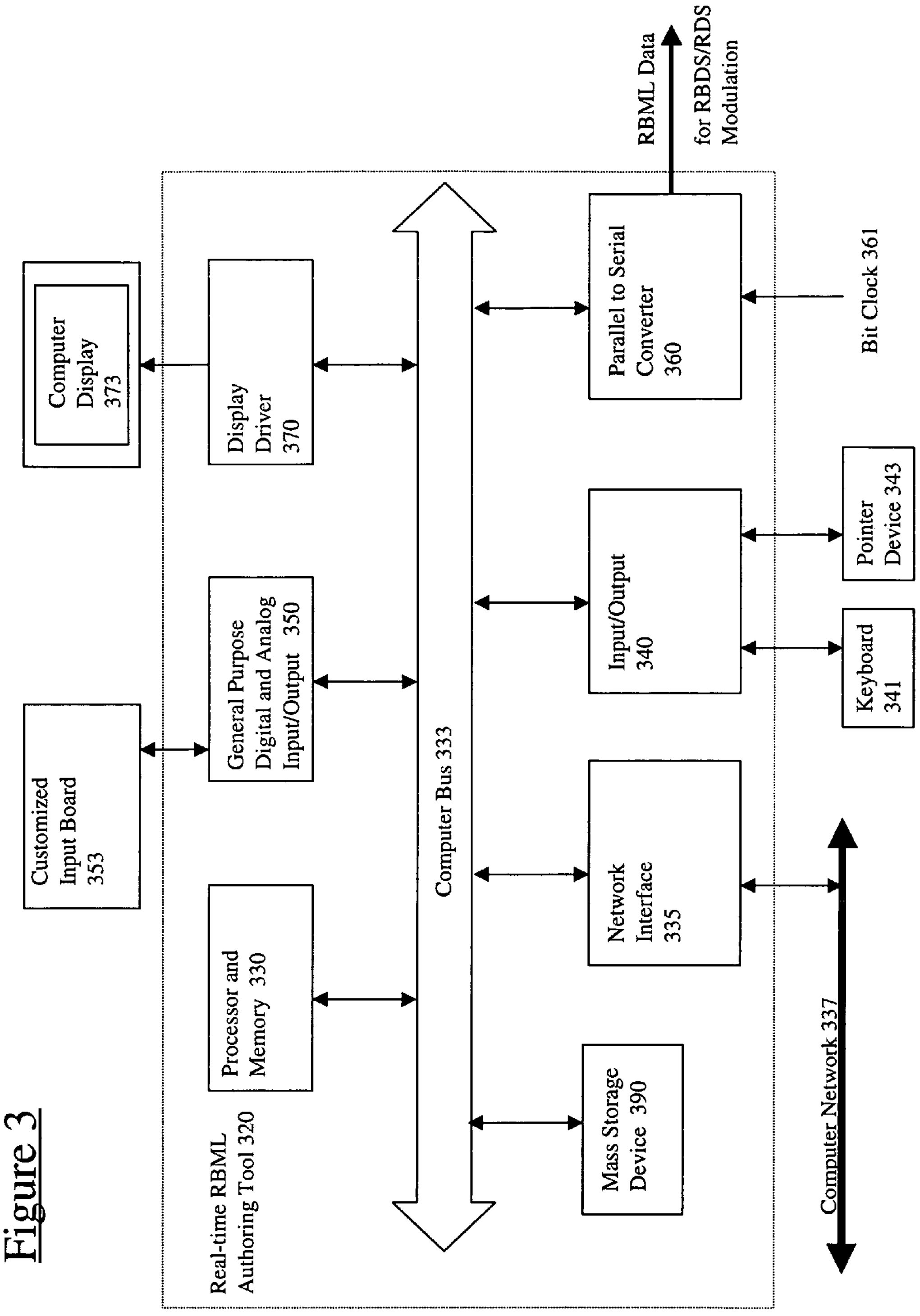
FIG. 3 illustrates a block diagram of a real-time authoring tool system embodiment.

FIG. 3 illustrates a block diagram of one possible embodiment of a real-time authoring tool console system 320. The real-time authoring tool console system 320 of FIG. 3 comprises a standard computer system. The computer system includes a processor and memory 330 coupled to a computer bus 333. The computer also includes a number of peripherals coupled to the computer bus 333 including a network interface 335, a mass storage device 390, an input/output circuit, and a display adapter 370 for driving a computer display 373. The network interface 335 allows an operator to access information that will be useful for generating RBML documents from a local area network (LAN) or the global Internet. The input/output circuit 340 couples keyboard 341 and pointer device 343 to the computer system.

The real-time authoring tool system 320 of FIG. 3 further comprises a general purpose input/output unit 350 that is used for inputting and outputting digital and analog information. The input/output unit 350 may be coupled to a specialized input board 353 that simplifies the task of entering RBML information. Finally, the real-time authoring tool system 320 of FIG. 3 includes a parallel to serial converter 360 that is used to output a serial bit stream of RBML data. The parallel to serial converter 360 is clocked using an input bit clock 361.

Figure 4:
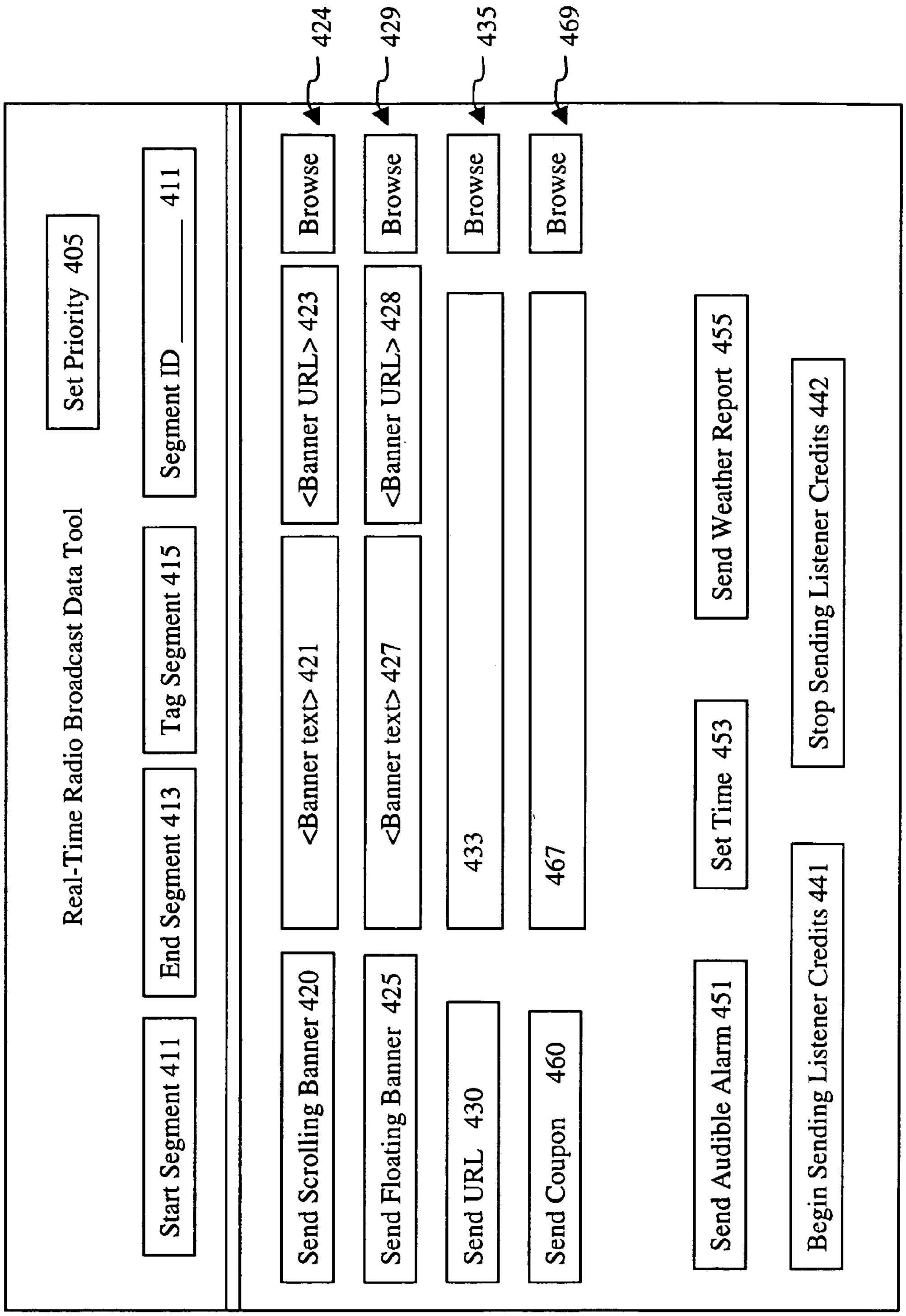
FIG. 4 illustrates an example of a graphical user interface that may be presented by a real-time authoring tool.

FIG. 4 illustrates one possible example of a graphical user interface that may be used by an operator to insert RBML documents into the RBDS/RDS data stream. To use the graphical interface, an operator simply clicks a named button to insert a particular tag. In a preferred embodiment, the user interface is presented as a web page such that the operator selects a link on his/her web browser.

Referring to FIG. 4, button icons 411, 413, 415, and 417 allow an operator to tag the beginning and end of a radio segment. The tagging of radio segments allows the web radio and associated computer to identify the beginning and end of various radio segments. This tags can be used to capture, organize, and replay radio segments as will be described later.

The scrolling banner text button icon 420 is used to send a scrolling banner message that will appear on the user's screen. The message is typed into scrolling banner input box 421. A URL can be associated with the scrolling banner message such that if the user clicks on the scrolling message, the user's web browser will be directed to the specified URL. The associated URL is entered into URL box 423 or located with a browser by clicking browse box 424. Similarly, the floating banner text icon button 425 is used to send a floating banner message that is typed into scrolling banner input box 427. A URL may be associated with the floating banner using URL input box 428 or browse button 429. Thus, using the banner input boxes and URL boxes, simple banner ads or announcements can be immediately be sent to web radio listeners in combination with the live analog audio feed.

Send URL button icon 430 is used to broadcast a Uniform Resource Locator that may be typed into URL input box 433 or located using the browse button 435. The send URL button icon 430 sends an RBML document with the GETURL tag which causes the user's web browser to open the specified URL. The GETURL tag may be controlled by various settings that require user interaction or filtering.

Send coupon icon button 460 is used to broadcast an electronic coupon that may be used by listeners. The coupon is more fully defined at a web site whose URL is entered into input box 467 or located after selecting the browse button 469. The send coupon icon button 460 sends an RBML document with the coupon information specified at the provided URL.

The icon buttons 451, 453, and 455 may be used to send an audible alarm, a clock setting document, or a weather report respectively. Other simple one-click icon buttons can be created for sending other popular pieces of information such as traffic reports, emergency broadcasts, station identification, etc.

Icon buttons 441 and 442 can be used by an operator to start and stop sending listening credits to tuned users. The listening credits are collected by the web radio receivers or associated computers for simultaneous or future internet upload to the broadcaster or related web page. Thus, the listening credits provide a means of audience participation.

FIG. 4 also includes a "set priority" icon button 405. The set priority icon button 405 allows the operator to specify a priority of the RBML tags that are being generated by the real time RBML authoring tool. The priority level may be use when the RBML tag stream of the real-time authoring tool are combined with other RBML tags such as RBML tags received from an emergency broadcast system. The graphical interface of FIG. 4 is meant to provide an example of one possible graphical user interface for a real-time RBML authoring tool. However, many variations exist.

These RBML tags can be generated by a disc jockey performing a live show or an engineer that is supporting the show at the broadcast station. Alternatively, the commands to insert RBML tags may be transmitted from a remote computer across the Internet such as a web server. With the web page embodiment, a remote access embodiment is simple to implement since RBML is a subset of XML is can be readily transmitted over the world wide web using the text/xml MIME type.

Offline RBML Sequencer/Authoring Tool

To allow prerecorded programs to be created, the present invention introduces an offline RBML sequencer/authoring tool. The offline RBML sequencer/authoring tool can be used to create prerecorded feature length radio programs or commercials.

Figure 5:
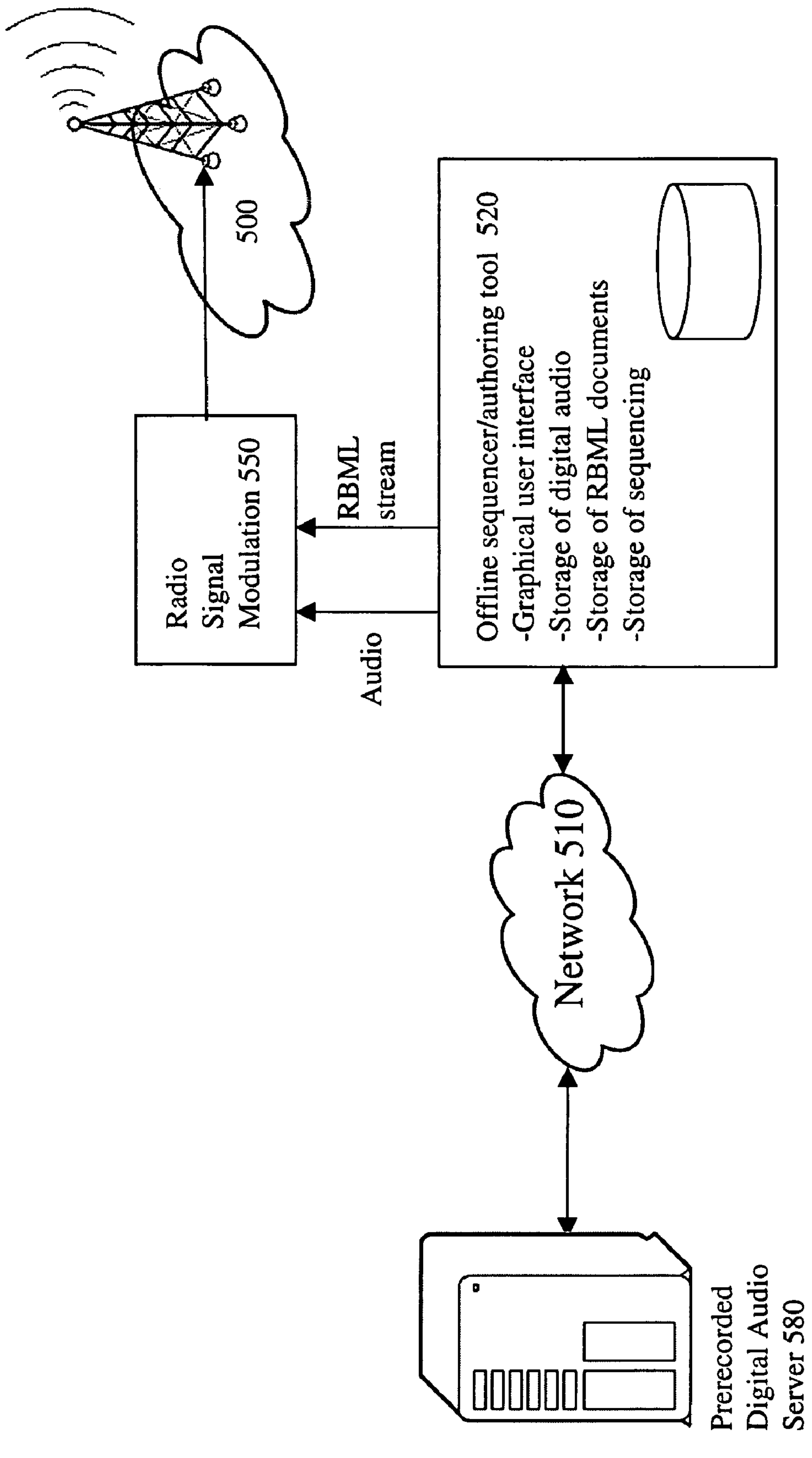
FIG. 5 illustrates how an offline RBML sequencer/authoring tool may be used within a radio broadcast station.

FIG. 5 illustrates a diagram that shows how the offline RBML sequencer/authoring tool is used within a radio broadcast station. Referring to FIG. 5, an operator works with an offline RBML sequencer/authoring tool console 520. The operator selects prerecorded audio that will be used in the program to be created. The prerecorded audio may be stored within the offline RBML sequencer/authoring tool console 520 or in a digital audio server 580. The operator also specifies the RBML documents that should be combined with the selected audio using a graphical interface on the offline RBML sequencer/authoring tool console 520. The combined audio and RBML stream is stored on a mass storage device within or coupled to the offline RBML sequencer/authoring tool 520. Later, when the program is to be broadcast, the combined audio and RBML stream is sent to a radio frequency modulator 550 that modulates the specified RMBL documents onto an FM subcarrier and modulates live broadcast audio onto an FM carrier. The FM signal is then broadcast using an FM transmitter and antenna 500. In should be noted that other frequency bands with other transmitters may be used.

Figure 6:
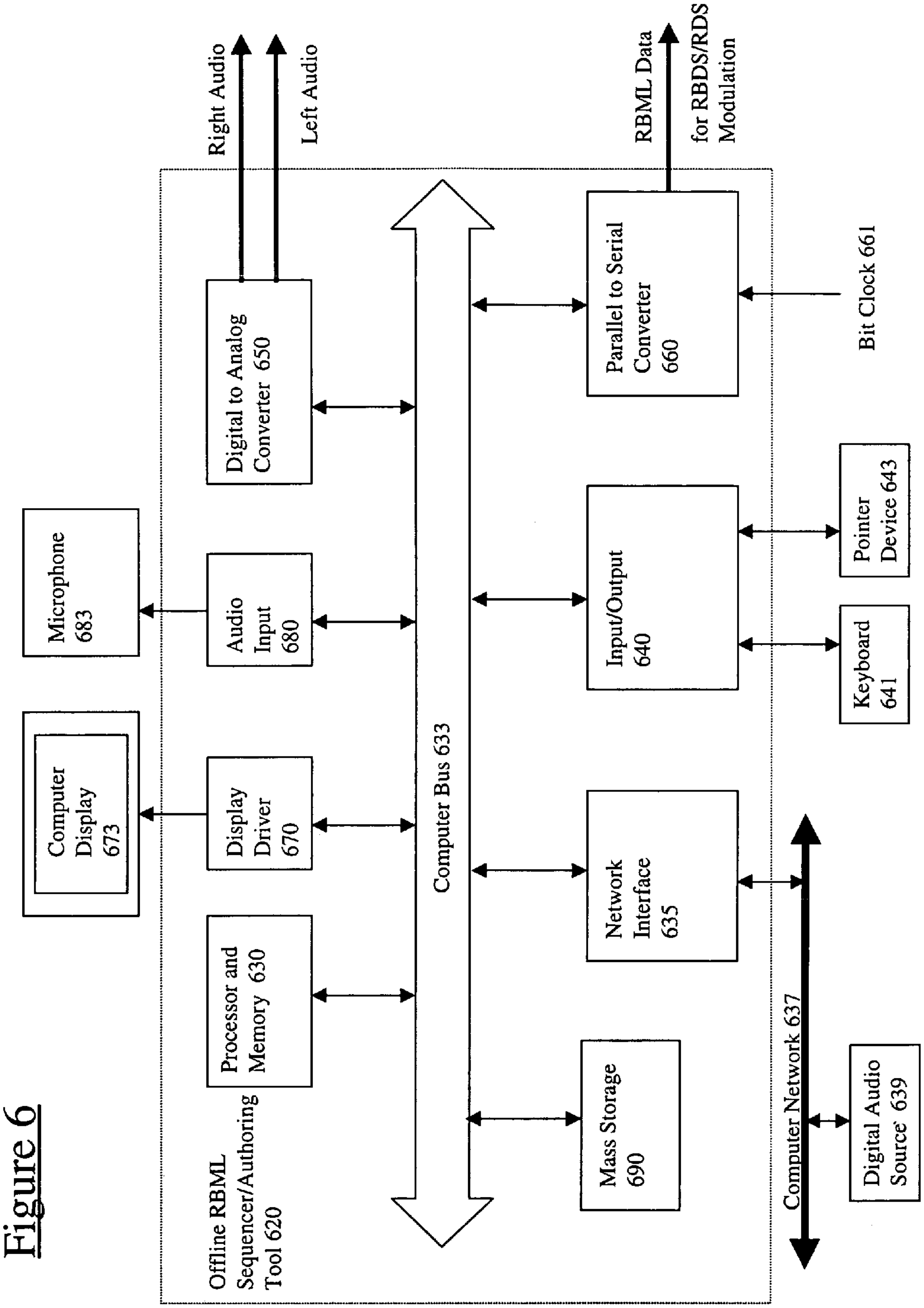
FIG. 6 illustrates a block diagram of an offline RBML sequencer/authoring tool embodiment.

FIG. 6 illustrates a block diagram of one possible embodiment of an offline RBML sequencer/authoring tool system 620. Referring to the embodiment of FIG. 6, the offline RBML sequencer/authoring tool system 620 comprises a standard computer system. The computer system includes with a processor and memory 630 coupled to a computer data bus 633. Also coupled to the computer data bus 633 are various input/output units such as a network interface 635, a mass storage device 690, an input/output circuit 640, a digital to analog converter 650, an audio input device 680, and a display driver 670 coupled to a computer display 673.

The network interface 635 allows an operator to access digitized audio information from digital audio sources such as digital audio source 639 coupled to a local area network (LAN) 637. The retrieved digitized audio information is stored on a local mass storage device 690. The network interface 635 also allows an operator to access other information from a local area network (LAN) or the global Internet wherein the accessed information will be useful for generating RBML documents. For example, URLs of web sites may be accessed.

Audio information can be entered directly using a microphone 683 coupled to audio input device 680. Thus, immediate voice-overs can be added by the operator using the offline RBML sequencer/authoring tool system 620.

The offline RBML sequencer/authoring tool system 620 of FIG. 6 further comprises a digital to analog converter 650 that is used for generating audio output during program editing and final broadcast. Finally, the offline RBML sequencer/authoring tool system 620 of FIG. 6 includes a parallel to serial converter 660 that is used to output a serial bit stream of RBML data. The parallel to serial converter 660 is clocked using an input bit clock 661.

Figure 7:
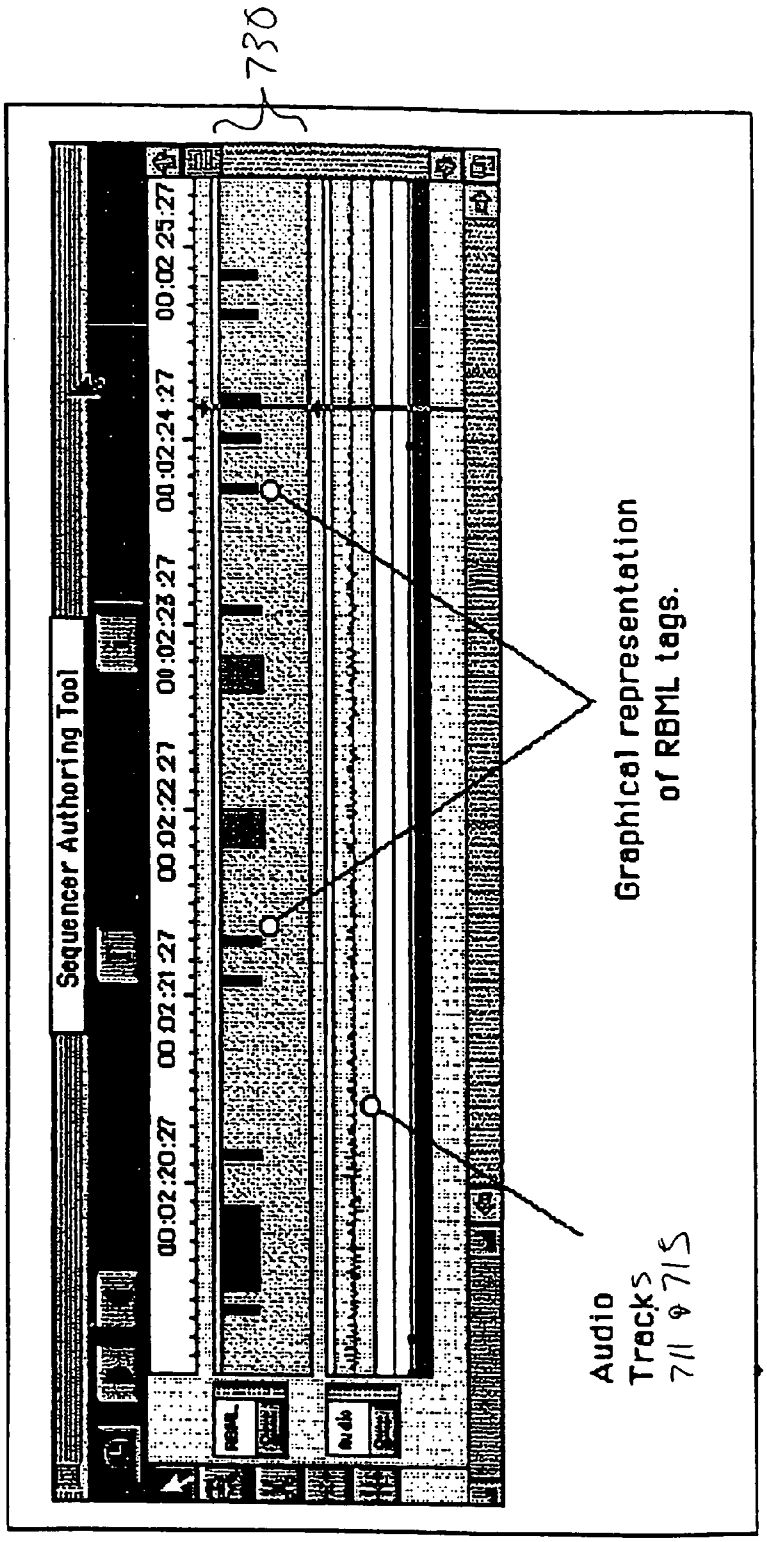
FIG. 7 illustrates an example of a graphical user interface that may be presented by a RBML sequencer/authoring tool.

FIG. 7 illustrates one possible example of a graphical user interface that may be presented by an offline RBML sequencer/authoring tool system 620 for editing prerecorded radio programs that consist of audio and synchronized RBML documents. Referring to FIG. 7, the graphical user interface is modeled after well-known music sequencer and video editing graphical user interfaces. Specifically, the graphical user interface presents a horizontal time line that consists of at least three tracks. The first two tracks 711 and 715 comprise the left and right audio channels that are being recorded. The audio tracks 711 and 715 are very similar to audio tracks on music sequencers and video editing units. A third track 730 is an RBML document track. The RBML document track 730 provides a graphical representation of RBML documents to be inserted into the radio program.

The RBML tags in the RBML document track 730 are represented as individual RBML tag icons. The width of the individual RBML tag icons is proportional to the size of the individual RBML tags and thus the time to transmit such RBML tags. The size of an RBML tag and thus the width of an associated RBML tag icon is automatically calculated by the offline RBML sequencer/authoring tool system. The detailed contents of an RBML document can be examined by selecting the associated RBML tag icons in the RBML document track 730.

To use the graphical interface of FIG. 7, an operator simply selects prerecorded audio tracks and places the audio tracks into the sequencer. Similarly, the operator creates RBML documents and places the RBML documents into the RBML document track 730. The graphical user interface of FIG. 4 may be used for creating RBML documents. Once a sequence has been created using the graphical interface of FIG. 7, the sequence is recorded onto the mass storage device 690 of the offline RBML sequencer/authoring tool system in FIG. 6. The sequencer provides precise time synchronization between the audio and RBML tracks.

To play a created audio program with a synchronized data track, the offline RBML sequencer/authoring tool system 620 of FIG. 6 outputs the sequenced audio tracks to the digital to analog converter 650 in synchronization with the sequenced RBML documents sent to the parallel to serial converter 660. The output of the digital to analog converter 650 and the parallel to serial converter 660 are sent to a RBDS/RDS modulator as illustrated in FIG. 5.

Web Radio Receiver System

Figure 8:
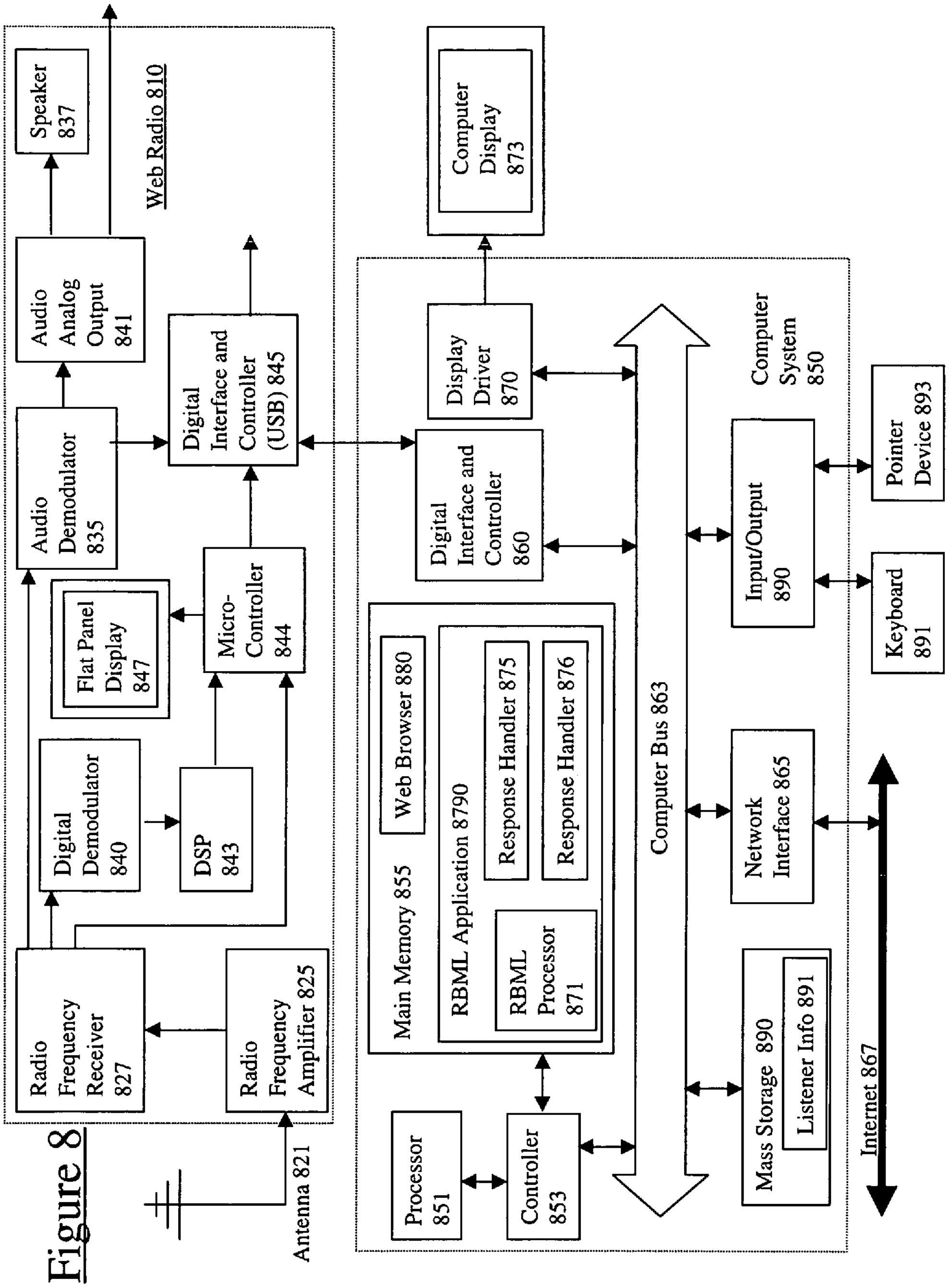
FIG. 8 illustrates a block diagram of one embodiment of a web radio receiver system.

FIG. 8 illustrates a block diagram of one embodiment of a web radio receiver system. Referring to FIG. 8, a web radio receiver system consists of a web radio unit 810 and an associated computer system 850. In the embodiment illustrated in FIG. 8, the web radio 810 is illustrated as a unit that is separate from the associated computer system 850. However, the web radio 810 may be implemented as an expansion card placed within the computer system housing such as a PCI card.

A Web Radio Unit

The web radio unit 810 receives radio signals using an antenna 821 and radio amplification circuitry 825. The radio amplification circuitry 825 amplifies the radio signal. The output of the radio amplification circuitry 825 is processed by a radio frequency (RF) receiver circuit 827 that converts the radio frequency signals to a baseband. The baseband signal output by the radio frequency receiver is supplied to both an audio demodulator 835 and a subcarrier digital demodulator 840. In a preferred embodiment, the subcarrier digital demodulator 840 demodulates a RBDS/RDS signal.

The audio demodulator circuitry 835 demodulates the main carrier audio components. The output of the audio demodulator circuitry 835 is provided to an analog audio output circuit 841 that drives one or more internal speakers 837, one or more externally coupled speakers, or any other analog device coupled to the analog audio output circuit 841. The output of the audio demodulator circuitry 835 also passes a stream of audio information to a digital interface and controller circuit 845 such that audio information may be passed to the computer system 850. As previously set forth, the preferred embodiment for the digital interface and controller circuit 845 is a Universal Serial Bus (USB) adapter. However, other types of digital interfaces may be used such as a serial link, a parallel port, a Peripheral Component Interconnect (PCI) bus interface, or an IEEE 1394 Firewire serial bus.

The subcarrier digital demodulator 840 outputs subcarrier components to a digital signal processor 843 that decodes the digital information. In a preferred embodiment, RBDS/RDS information is decoded from an FM subcarrier. The decoded digital information from the digital signal processor 843 is provided to a microcontroller 844 that may display digital information on a local display 847. The microcontroller 844 formats the information received from the DSP into data packets. The microcontroller 844 then passes the data packets to a digital interface and controller circuit 845. Note that the bus that connects the DSP 843 to the microcontroller 844 may be the same bus that connects the microcontroller 844 to the digital interface and controller circuit 845.

The digital interface and controller circuit 845 outputs the data packets out a digital interface to a connected digital device such as a computer system 850. In a preferred embodiment, the digital interface and controller circuit 845 outputs information using a Universal Serial Bus (USB) interface.

It should be appreciated that FIG. 8 illustrates only one possible web radio unit 810 design. The essential components of a web radio unit are a RF receiver, a demodulator, a decoder for the digital signal, and some type of connection to a computer system. Additional details on how the web radio 810 may be constructed can be found in the copending U.S. patent applications "Microprocessor Controlled Broadcast Receiver Embedded in an External Peripheral with-Digital Communications Interface" filed Jun. 8, 1998 having Ser. No. 09/093,663 and "Microprocessor Controlled Broadcast Receiver Embedded in Personal Computer with Digital Communications Interface" filed Jun. 8, 1998 having Ser. No. 09/093,825 which are hereby incorporated by reference into this document.

A Computer System

The computer system 850 may be a standard personal computer system. The computer system 850 includes a digital interface 860 for connecting to the web radio unit 810. In a preferred embodiment, the digital interface 860 comprises a Universal Serial Bus controller. A driver program is responsible for relaying information received from the web radio unit 810 through the digital interface 860 to an RBML application program 879 running on computer system 850. The RBML application program 879 processes and displays RBML documents received from the web radio unit 810.

Ideally, the computer system 850 is coupled to the Internet 867 through a network interface 865 such that the computer system 850 can access web sites on the Internet 867 in response to information received by web radio 810. However, the computer system can display content received from the web radio 810 without having a connection to the global Internet.

The Web Radio Software

The RBML application program 879 is made up of an RBML processor program 871 and several RBML response handlers 875 and 876. (Although only two response handlers are shown in FIG. 8, there may be many more.) In one embodiment, the RBML processor program 871 is the main processing routine that initially parses received RBML documents from the web radio unit 810. However, the parsing and processing tasks may be split between the web radio unit 810 or mostly performed within the web radio unit 810. The RBML response handlers 875 and 876 help the RBML processor program 871 process the RBML documents.

The RBML processor program 871 interoperates with an existing web browser program 880 in the computer system 850 such as Netscape's Navigator or Microsoft's Internet Explorer. To interact with Netscape's Navigator, a special Netscape plug-in program may be created. To interact with Microsoft's Internet Explorer, an ActiveX program may be created. The plug-in or ActiveX program supplies information and/or requests from the RBML processor program 871 such that the web browser program 880 performs desired tasks. For example, the RBML processor program 871 may request the web browser program 880 to access a particular web site by providing a destination URL.

When the RBML processor program is installed, the user may be asked for certain demographic information such as their name, address, age, sex, phone number, etc. This information is stored in a listener information file on the mass storage device 890. The listener information file may be used to provide listener information when the listener accesses a web site in response to a received RBML document.

To handle specific RBML markup tags, a set of RBML response handlers 875 and 876 are provided. Each RBML response handler performs the processing needed for a different type of RBML tag. For example, one of the most commonly used RBML response handler is the GET_URL handler function that is responsible for processing GETURL tags within RBML documents.

An Example Response Handler

As previously set forth, the GETURL RBML tag is one of the most commonly used RBML tags. The GETURL tag is used to have a web browser on the listener's computer system access a specified URL. Specifically, the GET_URL response handler instructs the listener's web browser to fetch the associated URL from the World Wide Web. The GETURL tag may initiate the browser fetch automatically or it may require user intervention. Alternatively, the GETRUL response handler may act automatically depending on a set of filters that determine the user's interests. For example, a user indicates an interest in sports and entertainment such that only links related to sports and entertainment are automatically fetched.

The contents of the web site specified by the URL dictate how the web browser will proceed. However, one parameter of the GETURL tag can be used to send additional data to the web site that is being accessed. Specifically, a listener information parameter can be used to append identification information about the user to the URL such that the accessed web site can use the listener information to form a response.

The listener information parameter may specify information such as the user's name, address, and telephone as well as the current radio station that is being listened to. Thus, the listener information parameter can provide just about any information that is available to the web site that is being referenced.

Figure 9:
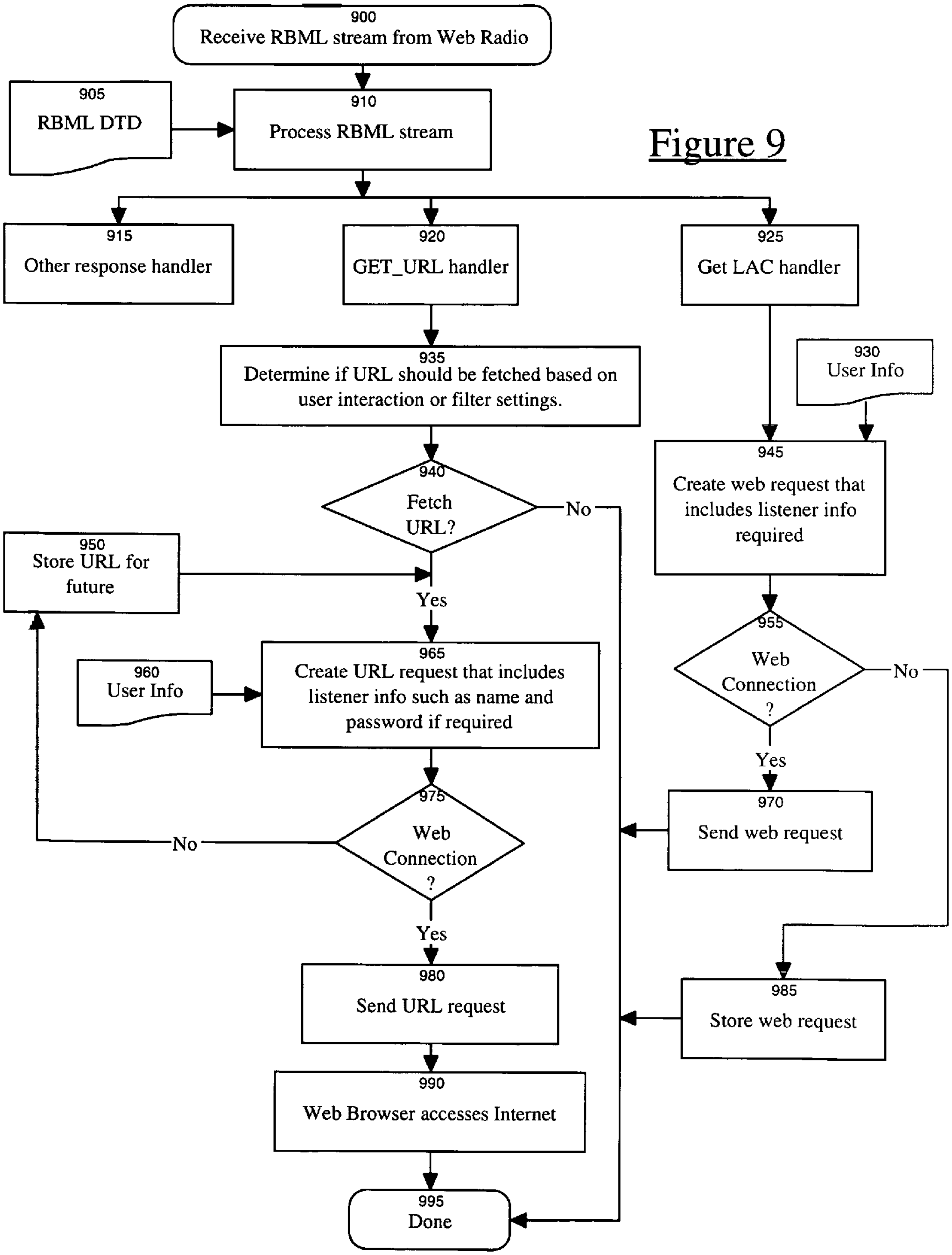
FIG. 9 illustrates graphically illustrates how the RBML processor may process RBML tags.

FIG. 9 illustrates graphically illustrates how the RBML processor may process an RBML tag. Referring to step 900 of FIG. 9, the RBML processor receives an RBML stream from a web radio unit. The RBML processor then processes the RBML stream at step 910 using information from the RBML DTD. The RBML processor then invokes the appropriate RBML response handler.

For example, if a GETURL tag is encountered, then a GET_URL response handler is invoked at step 920. At step 935, the GET_URL response handler determines if the URL should be accessed automatically. The GET_URL response handler is controlled by user settings that determine if a URL should be fetched automatically or require user interaction. For example, the user settings may specify a set of filters that describe the user's interests. If the URL falls within the user's interests, then the URL may be fetched automatically. Otherwise, user interaction is required or the URL may not be fetched at all. If at step 940 the GET_URL response handler determines that the URL should not be fetched, then GET_URL response handler is done as stated in step 995. Otherwise, the GET_URL response handler proceeds to step 965 to fetch the specified URL.

At step 965 the GET_URL response handler forms a web request to get the URL. In some situations, the web request may require user information from the user information file 960. The web request may be the HTTP GET command or the HTTP POST command. Next, at step 975, the GET_URL response handler determines if a web connection is available. If a web connection is not available, then the URL is stored for future reference at step 950. The GET_URL response handler may attempt to access the URL at a later time when a web connection is not currently available. If a web connection is available, then the GET_URL response handler sends a URL request at step 980. At step 990, the GET_URL response handler instructs the web browser to access the specified URL.

A second example of response handler is provided with a Listen Access Code tag in FIG. 9. At step 925 the Get Listener Access response handler is activated. At step 945, the Get Listener Access response handler creates a web request that includes the current radio station ID, information from the listener information file 930, and a time-to-live (TTL) parameter. This may be accomplished using the HTTP POST command.

Next, at step 955, the GET_URL response handler determines if a web connection is available. If a web connection is available, then the web request is sent. Otherwise, the web request is saved at step 985 and later attempts to send the web request are made. The time-to-live parameter may cause the web request to expire before it is eventually sent.

Web Radio Applications

The interactive web radio system of the present invention can be used in many different ways. This disclosure will provide examples of a few applications that interactive web radios can be used to implement. Specifically, the system of the present invention can be used to allow audience participation, provide audience tracking, provide listener credits, and enhance radio broadcasts through a combination of data pushed over the broadcast network and data pulled from the Internet.

Web Radio Enhanced Advertising

Radio advertisements can be enhanced by sending RBML documents (tags) that push text data to the receiver or which pull additional text, images etc. from a selected web site on the Internet. RBML tags control the general type of this display and can cause the transmitted or pulled content to be displayed in a dynamic scrolling banner, floating banner, or overlayed pop-up panel. For example, by referring to FIG. 4, insertion of RBML popup tags would cause the content retrieved from associated URL to be displayed in a pop-up panel overlayed on the current web page. This panel could contain buttons to interact with the listener or could simply disappear after a few seconds on the screen. Advertisements constructed in this fashion can thus deliver rich visual and interactive content which are synchronized with the radio broadcast. Note that from the users perspective this pulling of information from a web site is really information push since they did not need to do anything to initiate the retrieval of the information.

Web Radio Enhanced Linking

Information broadcast on the radio can be enhanced by using RBML commands to pull complementary text, image and audio content from a selected web site on the Internet. For example, using the GETURL RBML tag the users browser could be directed to a web site that displays additional information about the current topic under discussion, a song being played or background on a current sporting event. Advertisements and public service announcements can be supplemented by detailed information pulled from Internet web sites. The present invention thus provides a method of "pushing" information to the user by combining information pushed through the radio broadcast channel with information pulled from an Internet web site.

The Internet linking aspects of the present invention can be used to support audience participation in radio programs. For example, an audio track may play a selection of songs from different artists. An RBML document is then broadcast which requests the listener to select their favorite from amongst the broadcast selections. The web radio listener can make this selection via a pop-up menu. When a listener makes their selection, the result is sent back to a tallying web site which can then inform the broadcaster which songs the audience wishes to hear.

Similarly the broadcaster can provide quiz shows where questions are asked of the radio audience. Web radio listeners can respond to the quiz by selecting items on a pop-up menu generated through transmitted RBML. The listener's responses are again transmitted to the radio broadcaster who may select the first delivered response as the prize winner.

Web Radio Frequent Listener Credits

Figure 10:
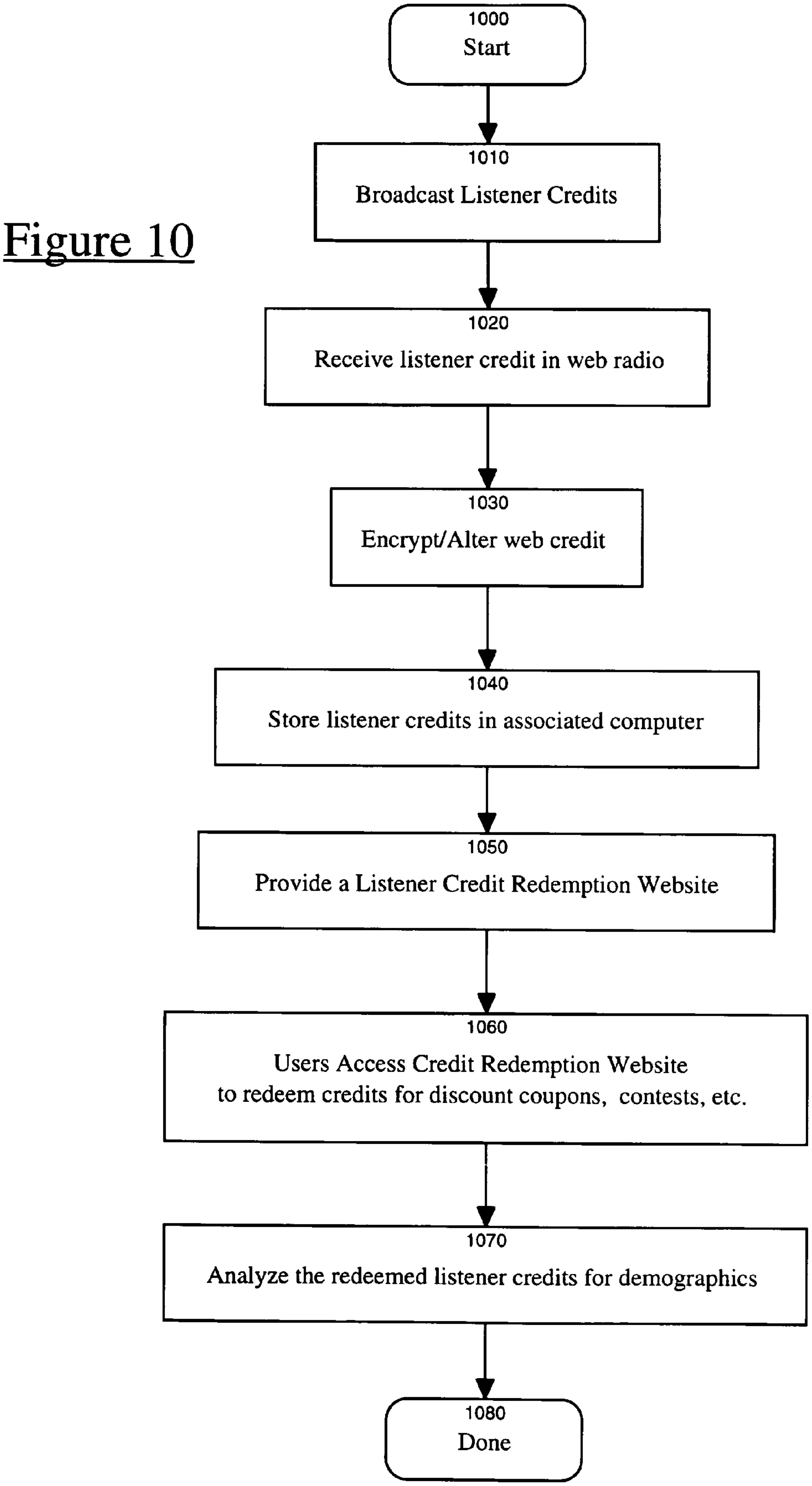
FIG. 10 is a flow diagram describing how the disclosed arrangement can be used to disclose redeemable listener credits.

Radio stations can promote their own programming by offering "listening credits" that are periodically delivered to the computers of listeners that are tuned to the station. The listener credits can be redeemed for discount coupons, or other promotional materials, exchanged for electronic cash, used in promotional contests or be a form of payment for software. Users might pay for the Web Radio in this manner. The listener credits of the present invention are somewhat analogous to airline frequent flyer programs. FIG. 10 illustrates one embodiment of a flow diagram that describes how listeners credit may be used.

Referring to step 1010 of FIG. 10, a radio station broadcasts listener credits. The listener credits may be broadcast continually or at certain times. FIG. 4 illustrates a graphical user interface for a real-time RBML authoring tool that includes simple icon buttons for starting (441) and stopping (442) the sending of credits. The listener credits specify the station that broadcast the listener credit and the time that it was broadcast. The listener credit may be encrypted with a private key associated with the broadcast station such that listener credits may not be forged. Next, at step 1020 of FIG. 10, the web radios that are on and tuned into the station sending credits receives the credits in the RBDS/RDS data stream.

After receiving a listener credit, the web radio (or a program in the associated computer system) encrypts or otherwise alters the listening credit using a key that ties the listening credit to the particular web radio or web radio user at step 1030. For example, a web radio system may encrypt the listening credits with a private key associated with the web radio listener's name. This prevents the listening credit from the copied and redistributed to others. The encrypted listening credit is stored in the computer system at step 1040.

To provide a means of redeeming collected web credits, a radio station establishes a web site as stated in step 1050. The web site provides a number of different offers for redeeming listener credits. For example, a listener could exchange listener credits for discount coupons for an event sponsored by the broadcast station. The listener could redeem credits for entries in a contest wherein the greater number of listener credits redeemed, the greater probability of winning the contest. The listener credits may even be redeemed for electronic cash. Any other real or virtual object may be exchanged for listener credits. Thus, at step 1060, listeners access the web site and redeem listener credits for various items.

It should be noted that by receiving redeemed listener credits, the broadcast radio station will learn about its audience. For example, the broadcaster will learn who is listening to the radio station (by accessing the listener information file) and when they are listening (by examining the time stamps on the listener credits). Furthermore, by combining the totals of redeemed credits, the radio station can determine the audience size and the peak listening hours. Thus, at step 1070, the broadcast station analyzes the redeemed listener credits to determine demographic information.

Web Radio Instant Replay

Figure 11:
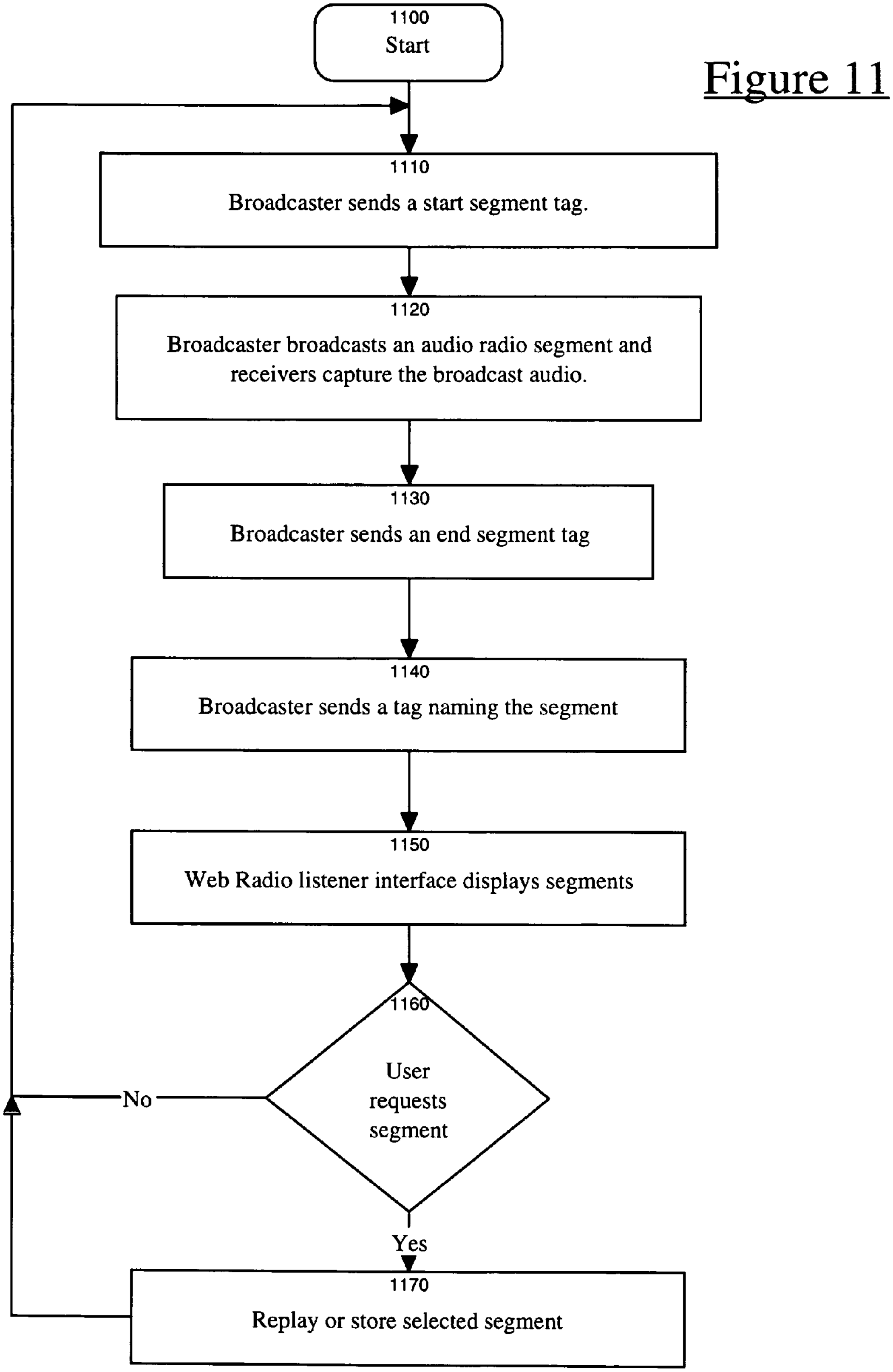
FIG. 11 is a flow diagram describing how the disclosed arrangement can be used to provide replays of audio segments.
Figure 12:
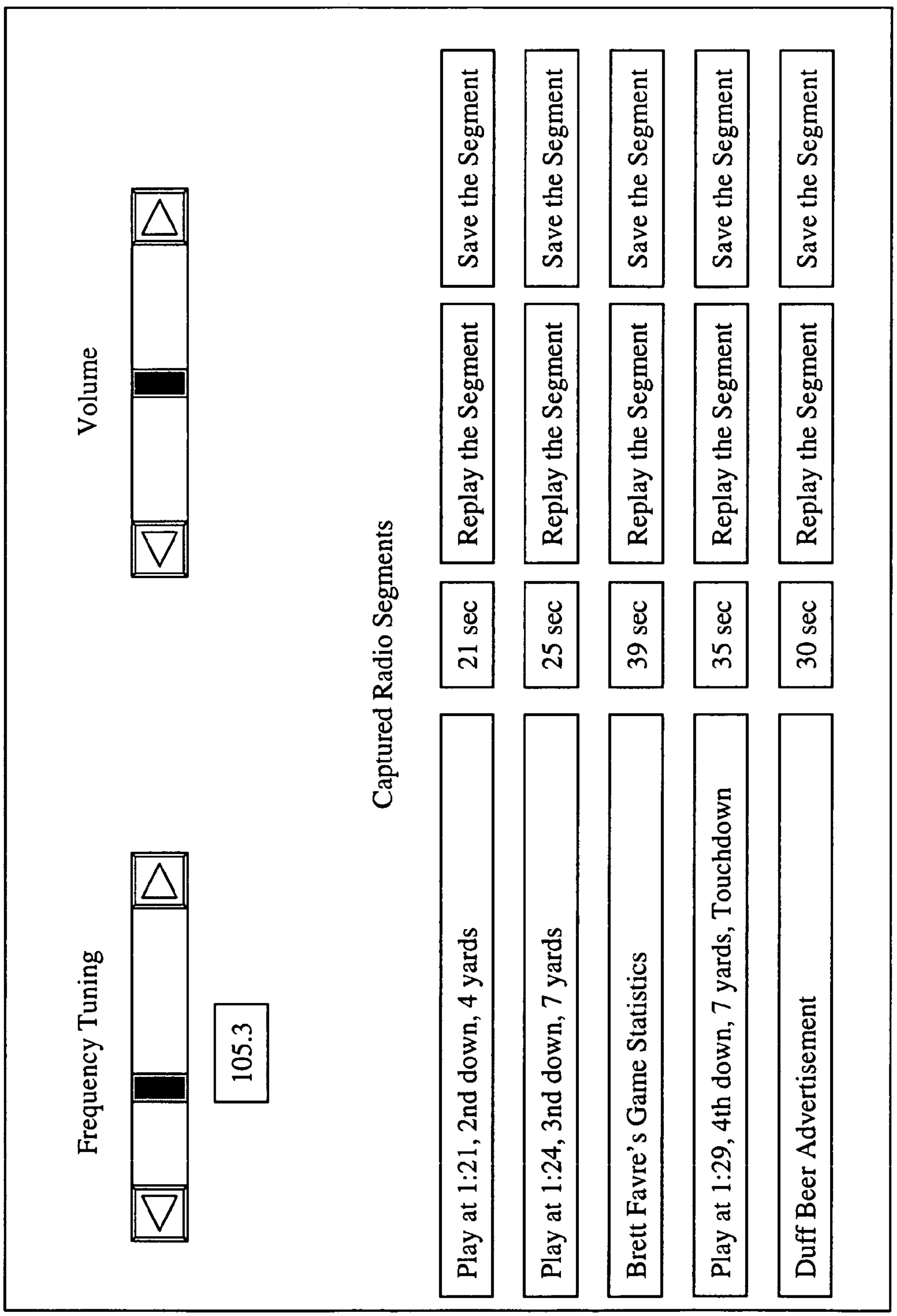
FIG. 12 is a diagram of a user interface for controlling a web radio system wherein the user can replay or save radio segments.

Referring back to the web radio system diagram in FIG. 8, it is shown that the audio information is digitized and passed to the digital interface. By storing recently received digitized audio in a circular buffer on the computer system 850, a web radio 810 and computer system 850 combination can act as a simple instant replay device. For example, during the broadcast of a sporting event, the commentary for individual "plays" can be replayed by the listener. FIGS. 11 and 12 describe how instant replay features may be implemented.

To act as an instant replay device, a start segment tag is sent by the broadcaster as show in step 1110 of FIG. 11 to indicate the beginning of a short audio segment. The broadcast proceeds to broadcast the audio segment while the receivers receive and temporarily store the digitized audio in memory or on a local storage device as stated in step 1120. When the audio segment ends, an end segment tag is sent as stated in step 1130. The broadcaster sends a name tag to provide a description for the audio segment as stated in step 1140. (In an alternate embodiment, the name tag is send before the start or during the audio segment.)

After the segment has ended, the receiver displays information about the received segment to the user at step 1150. FIG. 12 illustrates an example web radio graphical user interface for displaying instant replay information to a web radio listener. Referring to FIG. 12, a set of recently captured audio segments is displayed. Each audio segment is described with a text description that was sent with the name tag and length, in seconds. Each captured radio segment is accompanied by "replay segment" and "save segment" buttons that are used to replay or save audio segments respectively. To replay or save the audio segment, the computer system simply plays or saves the audio segment that is framed by the start segment and end segment tags as stated in step 1170 when the replay or save button is pushed as state in step 1170.

Audience Tracking

The web radio systems can be used to perform more detailed audience tracking than the system described in the earlier listener credit system. Specifically, the computers coupled to the web radio can be programmed to automatically send in audience listening habits to the broadcaster. In exchange for the privilege of receiving such information, listeners that allow such statistics to be recorded may receive additional listener credits, free gifts, or other compensation.

Figure 13:
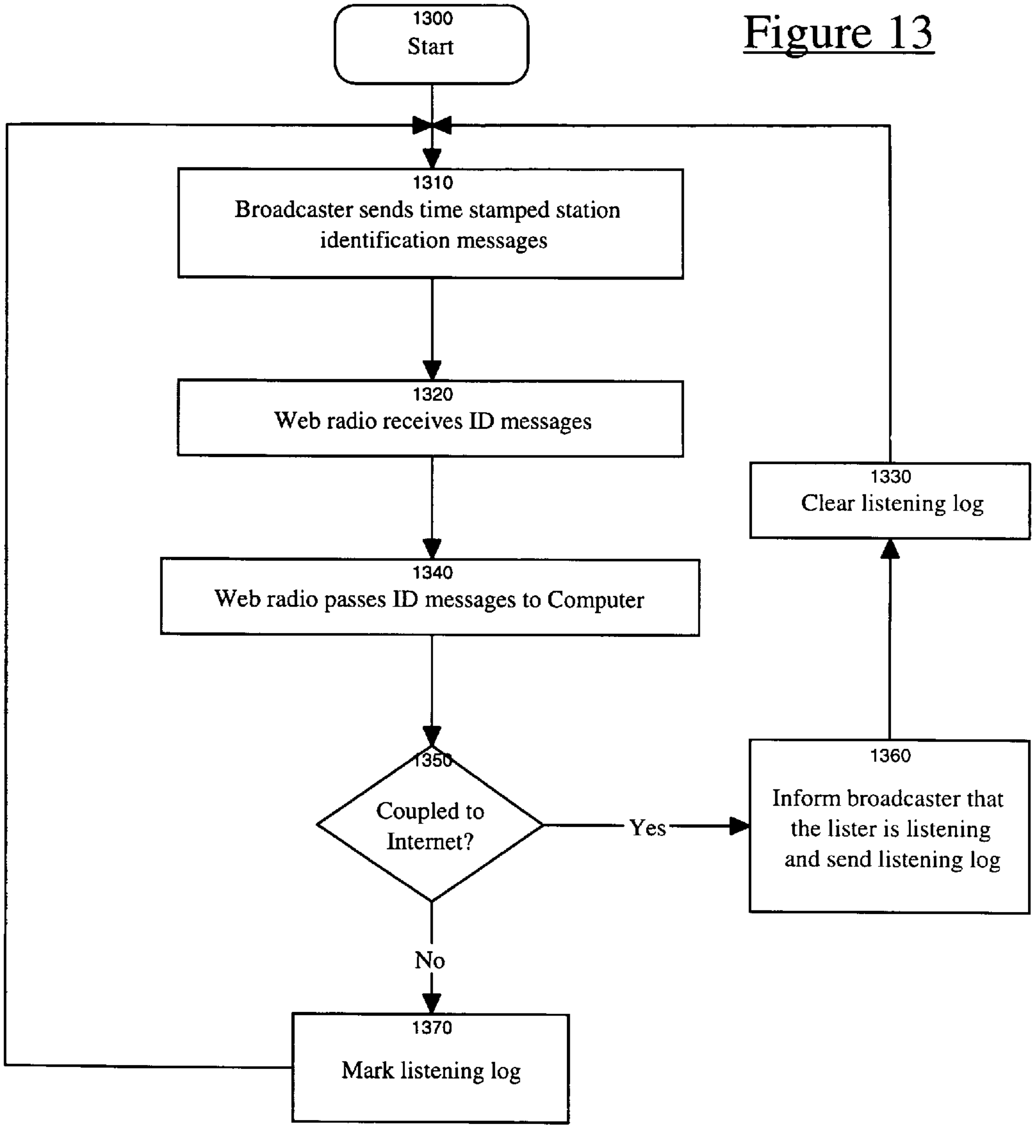
FIG. 13 is a flow diagram describing how the disclosed arrangement can be used to collect radio listener demographics.

FIG. 13 illustrates a flow diagram describing one possible automatic listener tracking system. Referring to step 1310, the broadcaster sends out time stamped station identification tokens. These time stamped station identification tokens may be similar to or in fact the same as listener credits. The web radios receive the time stamped station identification tokens at step 1320. The time stamped station identification tokens are passed to the computer system as stated in step 1340.

The computer system then determines if it is currently coupled to the Internet at step 1350. If the computer system is not currently coupled to the Internet, then the computer system marks a listening log in the computer system that the web radio is currently on and tuned into a particular broadcast station as stated in 1370. The listening log will be sent to the broadcaster at a later time when the computer system is coupled to the Internet. If the computer system is currently coupled to the Internet, then the computer system can inform the broadcaster's web site that another listener is listening as stated in step 1360. The listener information file can be sent to inform the broadcaster that this particular listener is currently listening. The computer system also sends the listening log at step 1360 if there were earlier times when the web radio was active but the computer was not coupled to the Internet. Then, at step 1340, the computer system clears the listening log. Thus, with the system of FIG. 13 detailed listener information can be tracked by a broadcaster.

In alternate embodiments, the computer system may simply store all time stamped station identification tokens in a log file. Then, at periodic times such as once a week, the computer system sends a central accounting agency the listening log information. This central accounting agency could then sell the listener demographic and listening habit information to the broadcast stations.

The foregoing has described a method and apparatus for distributing digital markup language documents using radio frequency subcarriers. It is contemplated that changes and modifications may be made by one of ordinary skill in the art, to the materials and arrangements of elements of the present invention without departing from the scope of the invention.

We claim:

1. An interactive broadcast reception system including a general purpose computer having a processor, display, and storage and internet connection, the system comprising:

(a) a broadcast receiver to communicate with the general purpose computer and to decode digital subcarrier data formatted as a broadcast markup language documents, said broadcast receiver being separable from said general purpose computer and including a removable faceplate portion to enable the transfer of listener credits to said interactive broadcast reception system; and (b) application software that runs on the processor of the computer and communicates with the broadcast receiver to control the operation of the broadcast receiver and to respond to broadcast markup language commands in said broadcast markup language document by connecting to an internet address referenced in said digital subcarrier data.

2. The system of claim 1, wherein said broadcast markup language document is formatted in the XML standard.

3. The system of claim 1, wherein said broadcast receiver has a memory.

4. The system of claim 1 wherein said application software sets listener information to the referenced internet address, the listener information being subsequently used by a corresponding website to provide a unique response to a listener associated with the interactive broadcast reception system.

5. The system of claim 4, wherein the at least one broadcast markup language document is inserted into the broadcast signal to provide an interactive simulcast of related broadcast audio and audience related functions, said audience related functions include responsive changes of the broadcast audio and hypermedia documents based on audience specific communications enabled through the internet connection.

* * * * *